United States Patent [19]

Axelrod

[11] 4,153,361
[45] May 8, 1979

[54] WEB CASSETTE WITH CARTRIDGE LOAD

[75] Inventor: Donald J. Axelrod, Glenview, Ill.

[73] Assignee: Bell & Howell Company, Chicago, Ill.

[21] Appl. No.: 793,621

[22] Filed: May 4, 1977

[51] Int. Cl.² ..................... G11B 23/10; G03B 17/00; G03B 17/26; G03B 27/32

[52] U.S. Cl. .................................. 354/275; 242/71.2; 354/203; 355/64

[58] Field of Search ................. 354/203, 275; 355/64; 352/78; 242/71.2, 199, 71, 71.1

[56] References Cited

U.S. PATENT DOCUMENTS

| | | | |
|---|---|---|---|
| 1,751,593 | 3/1930 | Merle | 242/71.2 |
| 1,829,332 | 10/1931 | Beck | 354/203 |
| 1,871,233 | 8/1932 | Proctor | 242/71.2 |
| 2,011,624 | 8/1935 | Della Gana | 242/71.2 |
| 2,756,940 | 7/1956 | Lessler | 242/71.2 |
| 3,252,370 | 5/1966 | Luther | 354/203 X |
| 3,379,108 | 4/1968 | Beyer et al. | 354/203 |
| 3,701,495 | 10/1972 | Holliday | 242/71.1 X |
| 3,883,090 | 5/1975 | Hall | 242/199 |

FOREIGN PATENT DOCUMENTS 398894  9/1933  United Kingdom .................. 352/78 R Primary Examiner—Donald A. Griffin
Attorney, Agent, or Firm—Alan B. Samlan; Harry G. Thibault

[57] ABSTRACT

A web cassette has a carrier plate with a supply and take up cartridges mounted thereon. The web is pulled from a reel in the supply cartridge, led over a path including guide posts or rollers, and connected to a reel in the take-up cartridge. A V-tooth coupler on each of these reels interfaces with driven V-tooth couplers on a machine using the cassette to transport the web from the supply to the take-up cartridge. When the transport is completed, the take-up cartridge is removed for processing, the former supply cartridge is moved to the take-up position on the cassette, and a new supply cartridge is mounted on the cassette.

20 Claims, 5 Drawing Figures

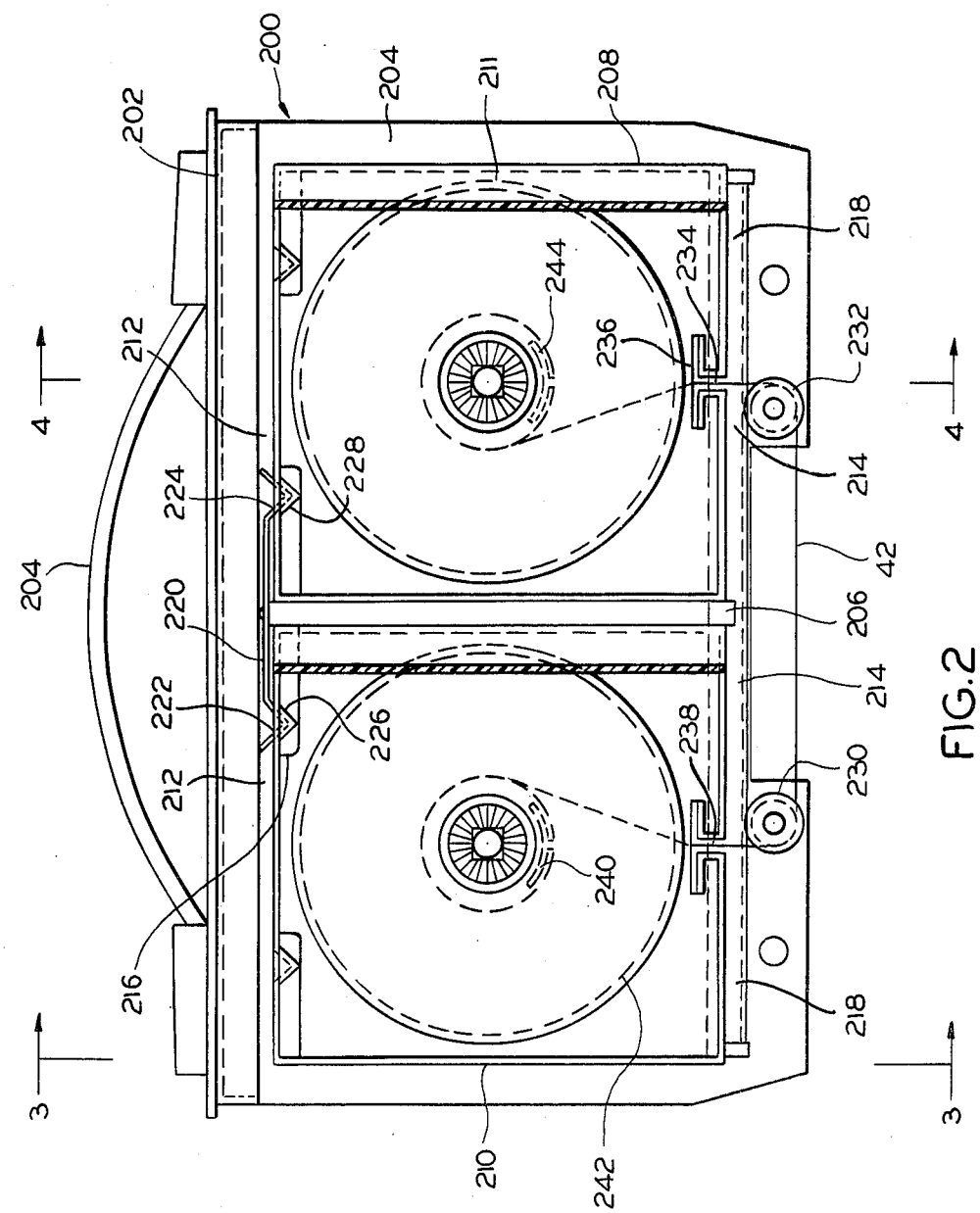

WEB CASSETTE WITH CARTRIDGE LOAD

This invention relates to web loading devices and more particularly to pre-loaded cassettes for loading a web into a machine.

One example of a machine using pre-load cassettes for loading a web is found in a copending application entitled "Automatic Microfilm Camera", Ser. No. 821,279, filed Aug. 3, 1977, by Donald Axelrod and J. Robert Flint, inventor, and assigned to the assignee of this application.

The invention finds utility whenever it is necessary or desirable to load and transport a web which may be exhausted. Therefore, it is not necessarily limited to use in cameras or any other particular device; however, it is actually used in the structure shown and described in the above-identified copending application. Accordingly, reference may be had to that application for more details concerning the utilization of the invention. To facilitate the comparison, some of the reference numerals used herein are the same as those used in the copending application.

In general, as used herein, a cartridge is a shell, housing, or other device containing a web. The cartridge may be a supply cartridge, in which case it contains a fresh web supply (such as unexposed film, for example). The cartridge may also be a take-up cartridge, in which case it contains a web which has been drawn from the supply and at least partially processed such as exposed, but undeveloped film, for example). A cassette is a device having both a supply and a take-up in a single unit. According to this terminology, the invention provides a cassette having a supply and a take-up cartridge mounted thereon. When the supply is exhausted, the take-up cartridge is removed from the cassette, the former supply cartridge is moved to the take-up position on the cassette and a new supply cartridge is mounted on the cassette.

There are several problems connected with web cassette and cartridge loaded devices. First, a disposable cassette or cartridge should be so inexpensive that it does not add any significant costs to the web material loaded into it. Second, the web must feed evenly with uniform tension and without snagging, jamming, bagging, or breaking. Third, it should be easy to load and unload the cassette or cartridge into the machine for using the web material. Fourth, the interface between the cassette or cartridge and its associated machine must be quite reliable so that there is no mechanical misalignment or malfunction.

Generally, the prior art has provided a large variety of cassettes or cartridges; however, they have tended to fail to solve all of the above-identified problems in a satisfactory manner.

Yet another problem has centered about the security of the web. For example, if the web is unexposed or undeveloped film, it is essential that the cassettes or cartridges are absolutely light-tight.

Accordingly, an object of the invention is to provide new and improved web cassettes or cartridges. Here an object is to provide cassettes or cartridges which solve all of the above-stated problems in a simple, low cost, and straight forward manner.

Yet another object of the invention is to provide cassettes and cartridges which are adaptable to use in self-loading machines without simultaneously requiring expensive auto-loading mechanisms.

Still another object of the invention is to provide a combination of cassettes and cartridges so that the low cost of a cartridge may be realized, and yet the convenience of a cassette may be enjoyed.

In keeping with an aspect of this invention, these and other objects are accomplished by providing a cassette with supply and take-up cartridges mounted thereon. When a supply cartridge is mounted on the cassette, the web is pulled over guide posts or rollers and threaded into a take-up cartridge also mounted on the cassette. A section of the web spans a gap between the guide post or rollers. Therefore, when the cassette is mounted in a machine, the section of the web spanning the gap may be fed through the machine for processing without having to rely upon any part of the cassette to complete the machine.

The nature of a preferred embodiment of the invention may be understood best from a study of the attached drawings wherein:

FIG. 2 is a plan view of a cassette embodying the invention;

Figure 1:
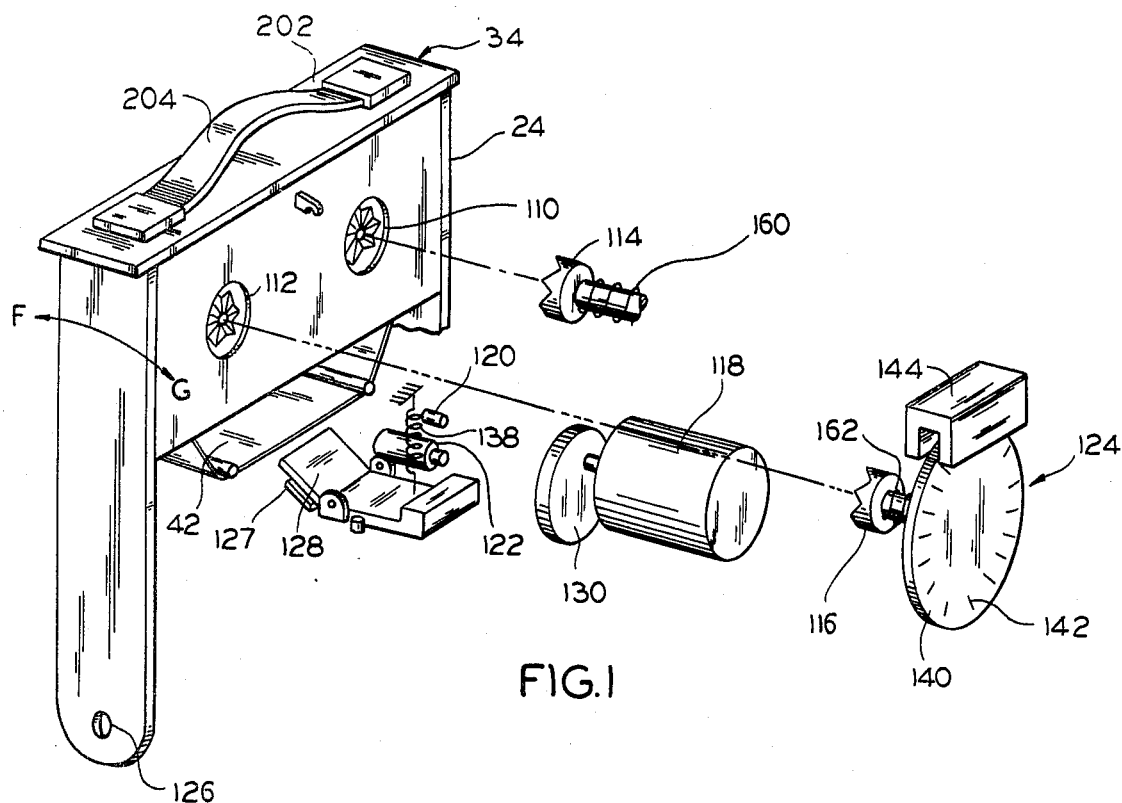
FIG. 1 shows an exemplary web cassette and associated parts of a machine for processing a web contained in the machine.

FIG. 1 is a perspective view of the inventive web cassette as used in conjunction with an associated machine. In this particular example, the associated machine is a microfilm camera, reader, or reader/printer described in the above-identified copending application. However, any other suitable machine may also be used.

This web transport means includes a cassette 34 carrying a preloaded cartridge containing a supply of the web following a path which emerges from the supply cartridge and then re-enters another take-up cartridge. The associated machine is operated responsive to an insertion of the cassette to engage the emerging web and to drive it past a format area or other web utilization station.

The major components in the web transport mechanism of the machine are a cassette receptacle and guideway 24, a pair of V-tooth couplings 110, 112, 114, 116, an AC motor 118, a capstan 120, pressure wheel 122, and a web transport speed detector 124. The machine stops prior to an insertion of the cassette. Then the guideway 24 swings in direction F on a pair of pivots (one of which is seen at 126) for loading and in direction G for operation of the machine. The supply cartridge containing a full reel of the web material 42 is associated with V-tooth coupler 112 and the take-up cartridge containing an empty reel is associated with coupler 110. When the cassette guide 24 is swung in direction G to the operating position coupler 110 meshes with coupler 114 and coupler 112 meshes with coupler 116.

At the time when the cassette 34 is loaded into the receptacle and guideway 24, the web transport mechanism is stopped and a pressure plate 127 and pressure plate carrier 128 are standing open. Also, pressure wheel 122 is moved away from capstan 120. Therefore, as carrier 24 swings in direction G, web 42 slips sideways under the pressure plate 127 and between the capstan 120 and pressure roller 122.

The positions of parts 127, 128 are controlled by a cam 130 which is contoured so that they are standing open while the web 42 is moving so that it will not be scratched.

More specifically, when the web, in this particular example, is being transported, the motor 118 takes one complete revolution after each function performed on the web. During a first 180° of that revolution, the capstan 120 is driven to advance the web 42 one frame length, and the pressure plate carrier 128 and pressure plate 127 are moved to the open positions. During the second 180° of that revolution, the capstan 120 and web 42 remain stationary while cam 130 rotates. At this time, the pressure plate carrier 128 moves to the closed position. The spring biased, floating pressure plate 127 holds the web 42 flat, in the format area. Therefore, as each function is performed on the web, the cam 130 rotates through the first 180°, to close the pressure plate carrier 128 responsive to the urging of spring 138. A solenoid (not shown) causes pressure roller 122 to push the web 42 against capstan 120.

The V-notch coupler 116 is connected to a web speed detector 124 which generates a signal for giving a low film signal. More specifically, attached to, and turning with, the web supply side, V-tooth coupler 116 is a transparent disc 140, with a plurality of marks 142 radially formed thereon. A light source and photocell combination 144 generates a pulse each time that a mark 142 passes therebetween, to cut the light falling on the photocell. As the supply reel becomes exhausted, it experiences a greater angular excursion for each web advance. Therefore, a greater number of pulses are generated by the photocell 144 responsive to each web advance. When a predetermined number of pulses are generate responsive to each web advance, a suitable end of web signal is given.

The cassette comprises a plate 200 having a generally L-shaped cross section. The short leg 202 of the L-shaped cross section has a handle 204 attached thereto. The long leg of the L-shaped cross section is a tray 204 which is divided in half by a central wall or stop member 206. As viewed in FIG. 2, the right-hand side of the tray 204 carries a supply cartridge 208 and the left-hand side carries a take-up cartridge 210. The cartridges terminate at their tops and bottoms in outstanding lips or edges 212, 214. Complimentary slide rails 216, 218 are formed on the tray 204 for capturing each of these lips when the cartridges 208, 210 slide sideways onto the tray. These slide rails preferably have an L-shaped cross section formed on tray 204. A double-ended leaf spring 220 attached to center wall 206 terminates the V-shaped detents or bends 222, 224 which snap into complimentary recesses 226, 228 molded into the cartridge walls. When the cartridges are slipped into their operating position, the detents 222, 224 snap into the recesses, and capture and hold the cartridges in their operating position.

Dependent from and supported by the tray 204 are a pair of guides or rollers 230, 232 for guiding and directing the web 42 from the supply cartridge 208 to the take-up cartridge 210. As supplied by the manufacturer, the web 42 is wound on a supply reel 211 in supply cartridge 208 and the end of the web 42 projects outwardly through a slot 234. When the web is a film, slot 234 is sealed by a suitable light sealing material 236, as here shown, by way of example. Accordingly, the end of the web 42 is pulled over guide rollers 232, 230 fed through slot 238 in cartridge 210, and into a capture slot 240 in the hub of take-up reel 242. A similar capture slot 244 is also formed in the hub of the supply reel 211.

Figures 3, 4, 5:
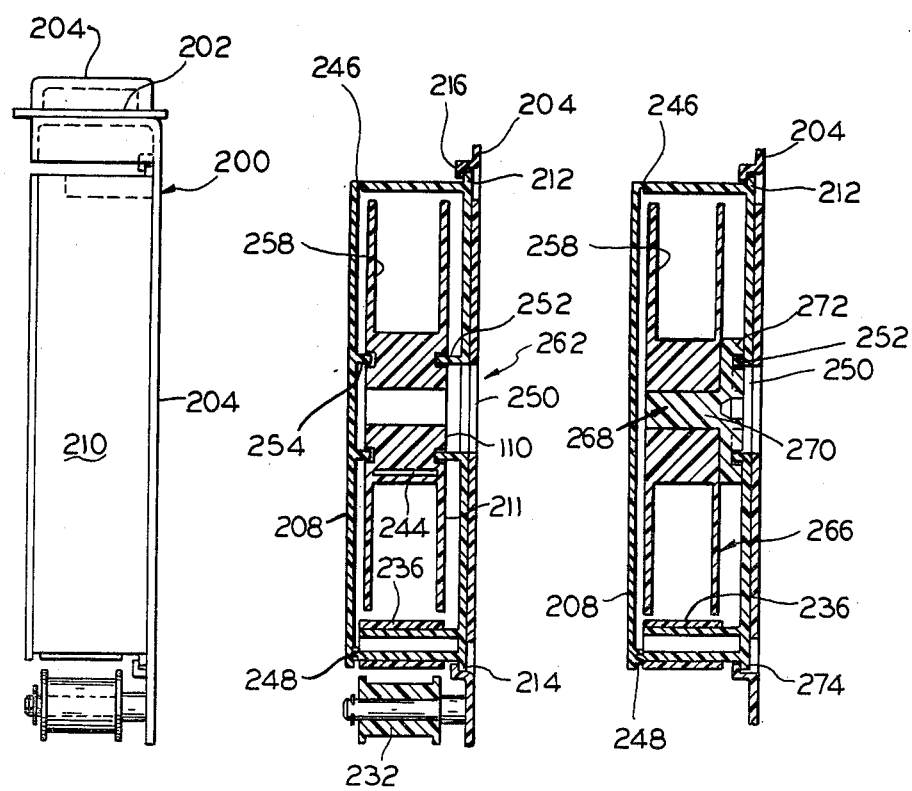
FIG. 3 is an end view of the cassette of FIG. 2 taken along the line 3—3 thereof.
FIG. 4 is a cross section view of a first embodiment of the inventive cartridge, taken along line 4—4 of FIG. 2.
FIG. 5 is a similar cross section view of a second embodiment of the cartridge.

To facilitate the threading of the film into the take-up cartridge 210, it is made as seen in FIGS. 3 and 4. In greater detail, the cartridges 208, 210 are each a molded plastic box having a top integrally molded therewith. A thin part 246 at one edge of the box forms a hinge between the box and its top. All of the other three edges of the box and top have beaded channels 248 molded therein so that the cover snaps in place. Thus, the cover may be open when the film led over roller 230 is connected to the take-up reel 242.

A hole 250 is formed in one side of each cartridge, and also corresponding holes are formed in cassette plate 204 to enable an entry of a web drive coupling. In order to provide a light seal between hole 250 and the film, opposed upstanding annuluses 252, 254 are molded in the cartridge walls. Mating annular recesses are molded into the reel. Therefore, there is no direct path for light to either pass or be reflected. The annuluses and recesses also form hub areas for supporting the reel 211.

The hub area 262 of the reel 211 has one half 110 of the V-tooth coupler molded therein. Therefore, when the cartridge carrier of FIG. 1 is swung in direction G, to a seated position, the other half 114 of the V-notch coupler enters hole 250 and engages coupler 110.

The reel of FIG. 4 is a preferred reel for the web transport system disclosed herein. However, many industries have standarized on certain reel configurations 266 (FIG. 5). Therefore, there may be occasions when it is necessary or desirable to use these standardized reels 266, which often have square holes or openings in the hub area to be mounted on square posts in the associated machines. It is difficult to fit these reels on the posts since the keyed hole or openings and shaft must be perfectly aligned, and they tend to inadvertently turn.

According to the invention, a separate adapter or piece part 268 is provided in the form of a shaft 270 having a disc 272 integral with one end thereof and generally perpendicular to said shaft. The shaft 270 has a generally square (or other suitable shaped) cross section to fit into the corresponding hole or opening in the standard reel 266. The side of the disc 272 which is opposite the shaft contains V-teeth so that it may be fitted into the mating coupler 114 (FIG. 1). The side of the disc 272 which includes the V-tooth coupler has an annular recess, for receiving said upstanding annulus 252.

The springs 160, 162 (FIG. 1) load the couplers 114, 116 in order to compensate for minor variances caused by manufacturing tolerances.

Those who are skilled in the art will readily preceive how the invention may be modified. Therefore, the appended claims are to be construed to cover all equivalent structures.

I claim:

1. A web cassette having a carrier plate with identical interchangeable supply and take-up cartridges mounted thereon, each of said cartridges containing a reel having a central hub and opposed reel sides for retaining a web therebetween, means for guiding said web pulled from a reel in the supply cartridge over a path including guide posts or rollers mounted on said cassette, and onto a reel in the take-up cartridge, V-tooth coupler means on each of the reels in order to interface with mating V-tooth couplers on a machine using the cassette to transport the web from the supply to the take-up cartridge.

2. The cassette of claim 1 and means for removably mounting said cartridges on said cassette comprising a lip at one end of said cartridge and a recess at an opposite end slidably engaging respectively a complimentary slide rail and a detent on said carrier plate so that when the transport of the web is completed, the take-up cartridge may be removed for processing, the former supply cartridge is moved to the take-up position on the cassette, and a new supply cartridge is mounted on the cassette.

3. The cassette of claim 2 further comprising stop means on said carrier plate to position said cartridges and wherein said guide posts or rollers are mounted on said cassette in positions adjacent each of said cartridges which form a path outside of said cartridges which enables said web to be inserted into an associated machine for transporting said web.

4. The cassette of claim 3 wherein said V-toothed coupler means on each of said reels engage said mating V-tooth couplers in said machine after said web has been inserted into said machine.

5. The cassette of claim 4 wherein said web is microfilm, said machine is a microfilm camera, reader, or reader/printer, capstan means accessed for engaging and driving said microfilm, and pressure plate means accessed for holding said film in a planar position within a format area in said machine.

6. The cassette of claim 1 wherein at least one of said reels is a reel having a hub area adapted to be mounted on a spindle in said machine, and adapter means comprising a spindle having a V-tooth coupler formed on one end thereof, said spindle fitting into the hub area of said reel, and said V-tooth coupler fitting against the mating coupler in said machine.

7. The cassette of claim 1 wherein said V-toothed coupler means on at least one of said reels comprises an adapter to fit a reel having a standard hub opening, said adapter comprising a shaft having a cross section conforming and fitting into said standard hub opening, said shaft terminating at one end in a disc which lies in a plane perpendicular to said shaft, and V-tooth coupler means formed on the side of the disc which is opposite said shaft.

8. The adapter of claim 7 wherein said cross section is generally square.

9. The adapter of claim 7 wherein said shaft, disc, and V-tooth coupler are an integral part.

10. the adapter of claim 7 wherein the side of said disc which includes said V-tooth coupler also has an annular recess for receiving an upstanding annulus associated with a device which includes the other side of said V-tooth coupler, for forming a light-tight seal at said coupler.

11. A web cassette having a carrier plate with a supply cartridge mounted on one end and a take-up cartridge mounted on the other end, each of said cartridges containing a reel, means for guiding a web pulled from a reel in the supply cartridge over a path including guide posts or rollers mounted on said cassette, and onto a reel in the take-up cartridge, a section of the web spanning a gap between the guide post or rollers, pivoted guideway means mounted on said machine to receive said cassette so that said cassette moves with a slightly sideward component to give said web a sliding motion, the section of the web spanning the gap feeding through the machine for its processing, without having to rely upon any part of the cassette to complete the machine itself, V-tooth coupler means on each of said reels in order to interface with mating V-tooth couplers on said machine using the cassette to transport the web from the supply to the take-up cartridge.

12. A process for transporting unexposed photographic film comprising the steps of:
(a) mounting a supply cartridge containing a reel having a central hub and opposed reel sides for retaining the film therebetween and an identical, but empty, cartridge on a cassette having at least one slide rail and a detent slidably engaging respectively a lip at one end of said cartridge and a recess at an opposite end;
(b) sealing each of said cartridges against leakage of light;
(c) pulling said film from said supply cartridge, over at least pair of guide means, whereby said film spans a gap, and taking up said film in said empty cartridge; and
(d) mounting said cassette in a machine whereby the film spanning said gap is inserted into a film processing part of an associated machine, so that said machine drives and processes said film in the area spanning said gap, without relying upon the cassette for any part of the processing.

13. The process of claim 12 wherein said web is photographic film and said machine is a camera, reader, or reader/printer, and the added steps of:
(f) providing a format area in said camera with a pressure plate poised over said format area to hold film in a planar state in the focal plane of said camera,
(g) slipping said film under said pressure plate,
(h) automatically closing said pressure plate responsive to at least the operation of means in said camera for exposing said film,
(i) exposing said film,
(j) automatically opening said pressure plate after exposing said film, and
(k) automatically transporting said film while said pressure plate is opened.

14. A film cartridge for mounting on a cassette used in an automatic microfilm camera, said cartridge comprising a box-like structure terminating at top and bottom of one side in lip edges adapted to be captured when mounted on said cassette by complimentary slide rails, at least one of said lip edges having a recessed portion which is engaged by a detent on said cassette, the central region of said one side being shaped to form an opening which is in register with an opening on said cassette when said lips are captured on said cassette, reel means inside said cartridge for receiving and supporting a length of film, and V-tooth coupler means formed on said reel and registering with said opening in said cartridge.

15. The film cartridge of claim 14 and top means forming a side of said box-like structure which is opposite said one side having an integrally formed hinge means for opening and closing to enable said reel means to be inserted into or removed from said cartridge.

16. The film cartridge of claim 14 and light seal means surrounding said opening to preclude light leakage through said opening to said film.

17. The film cartridge of claim 14 and a slot formed in said box-like structure for enabling film to be withdrawn from said cartridge, and light sealing means for closing said slot, thereby enabling said film to be withdrawn from said cartridge without permitting light to enter said slot.

18. The cartridge of claim 14 wherein the hub of said reel has a standard opening formed therein and said V-tooth coupler comprises a disc having an upstanding post formed on one side thereof and said V-tooth coupler formed on the other side thereof, said post having a shape for fitting into said standard hub opening of said reel.

19. The film cartridge of claim 14 and top means forming a side of said box-like structure which is opposite said one side for enabling said box to be opened and closed so that said reel means may be inserted into or removed from said cartridge, light seal means surrounding said opening to preclude light leakage through said opening to said film, a slot formed in said box-like structure for enabling the film on said reel to be withdrawn from said cartridge, and light sealing means for closing said slot, thereby enabling said film to be withdrawn from said cartridge without permitting light to enter said slot.

20. The process of claim 12 and the additional step of loading said unexposed photographic film into said supply cartridge on a reel having a central hub and opposed reel sides for retaining said film therebetween.

* * * * *

UNITED STATES PATENT AND TRADEMARK OFFICE
CERTIFICATE OF CORRECTION

PATENT NO. : 4,153,361
DATED : May 8, 1979
INVENTOR(S) : Donald J. Axelrod

It is certified that error appears in the above-identified patent and that said Letters Patent are hereby corrected as shown below:

In Column 6:

Line 28, "(f)" change to --(e)--;

Line 32, "(g)" change to --(f)--;

Line 33, "(h)" change to --(g)--;

Line 36, "(i)" change to --(h)--;

Line 37, "(j)" change to --(i)--;

Line 39, "(k)" change to --(j)--.

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*